(No Model.)  2 Sheets—Sheet 1.

J. & F. CAVAGNARO.
METAL TURNING LATHE.

No. 304,501. Patented Sept. 2, 1884.

Witnesses:
E. M. Hugentobler
F. J. Herron

Inventors:
John Cavagnaro
Francis Cavagnaro (No Model.) 2 Sheets—Sheet 2.
J. & F. CAVAGNARO.
METAL TURNING LATHE.
No. 304,501. Patented Sept. 2, 1884.
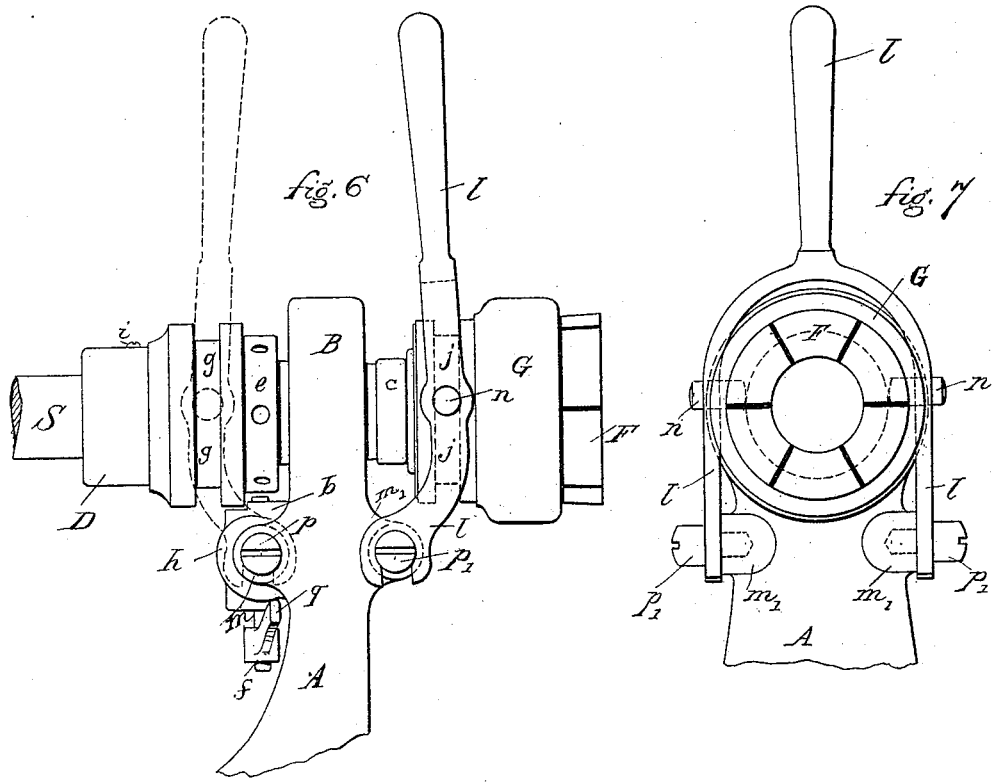
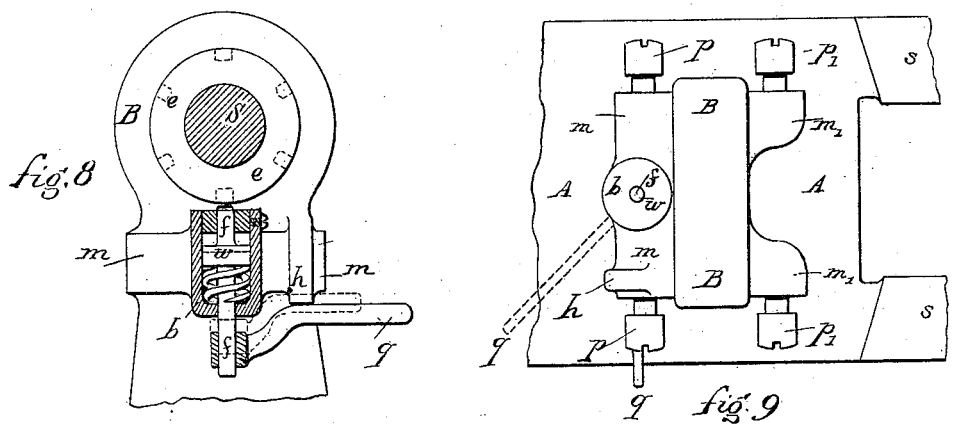
Witnesses:
E. M. Hugentobler
H. J. Herron
Inventors:
John Cavagnaro
Francis Cavagnaro

UNITED STATES PATENT OFFICE.

JOHN CAVAGNARO AND FRANCIS CAVAGNARO, OF NEW YORK, N. Y.

METAL-TURNING LATHE.

SPECIFICATION forming part of Letters Patent No. 304,501, dated September 2, 1884.

Application filed November 8, 1883. (No model.)

*To all whom it may concern:*

Be it known that we, JOHN CAVAGNARO and FRANCIS CAVAGNARO, of the city, county, and State of New York, have invented a new and useful Improvement in Speed-Lathes, of which the following is a full and complete description, reference being had to the accompanying drawings, forming part of this specification.

Our invention relates to speed-lathes used for turning out light pieces in large quantities; and its object is to provide means for chucking or unchucking the work, either inside or outside, as the case may be, very rapidly, or even with the lathe in motion, and also means whereby the spindle of the lathe may be locked when required.

Figure 1:
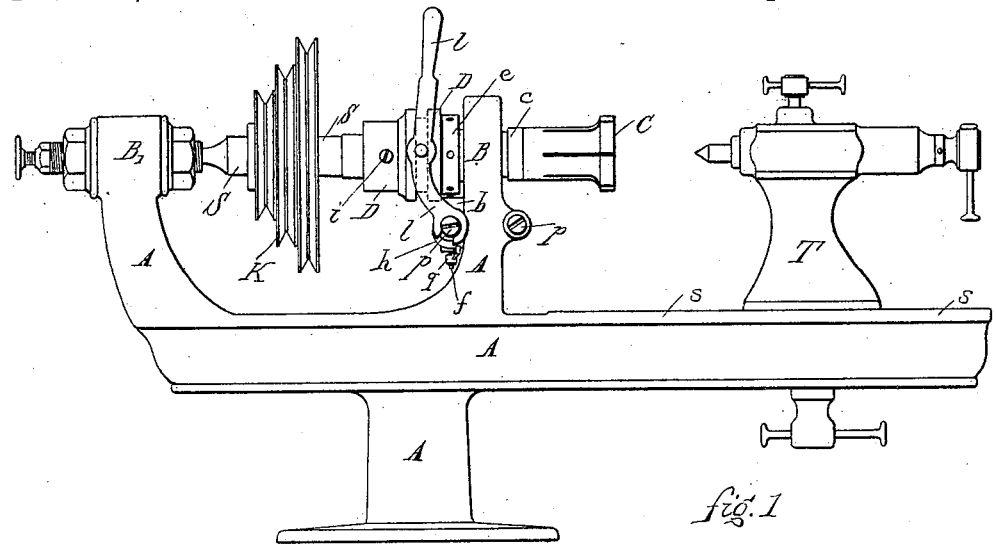
Figure 2:
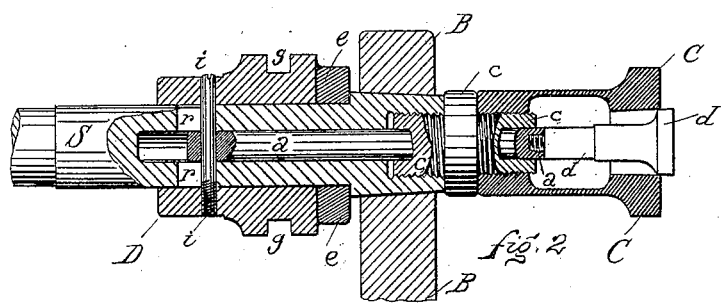
Figure 3:
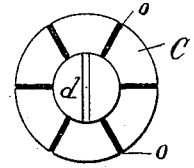
Figure 4:
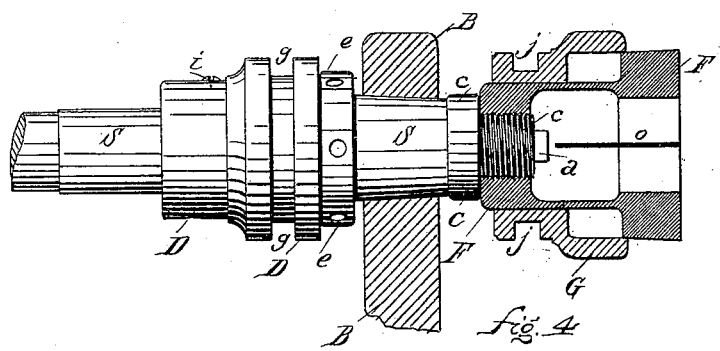
Figure 5:
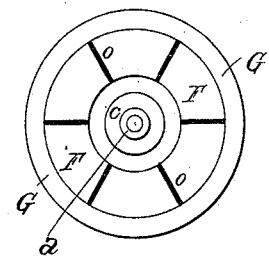

Referring to the drawings, in which the same letters designate the same parts in the different views, Figure 1 represents a side elevation of a lathe embodying our invention, the spindle being represented as carrying an inside chuck. Fig. 2 represents in section a portion of the lathe-spindle with its inside chuck attached, together with the device for tightening said chuck. Fig. 3 is an end view of the inside chuck. Fig. 4 shows the spindle with a sectional view of an outside chuck attached thereto, together with device for tightening said chuck. Fig. 5 is an end view of the outside chuck. Figs. 6 and 7 are respectively a side and end view of the spindle carrying an outside chuck, together with its tightening device and the lever for working the same. Fig. 8 is a vertical cross-section just back of the collar $e$, looking toward the tail-stock; and Fig. 9 is a plan of the bearing B with the spindle removed.

Referring to Fig. 1, A represents the frame of the lathe. $s$ are the shears. The two bearings B and B', forming the head of the lathe, are cast with the frame. The main spindle S has a conical journal in the bearing B, and its rear end is supported in an adjustable plug in the rear bearing, B', the construction of which may readily be understood by reference to the drawings. T is the tail-stock, made of any suitable pattern. K is the conepulley on the spindle. Shown here of the form adapted for round belts. C is the inside chuck. $c$ is a plug or chuck-base for carrying the chuck. It is formed, as shown in Fig. 2, with a collar or shoulder and two threaded ends, one of which screws into the spindle S and the other into the chuck. The chuck-base $c$ may be considered as constituting a part of the spindle. $e$ is a collar secured permanently upon the spindle S, and is a portion of the locking device to be described below. D is a sleeve free to move longitudinally on the spindle S. The spindle S is bored out, as shown, to a certain distance back, and into it and through the plug $c$ runs a rod, $a$. A screw-pin, $i$, runs, as shown, through the sleeve D and the rod $a$, and through longitudinal slots $r$ and $r$ on the spindle S. It can be readily understood, therefore, that, although the sleeve D revolves with the spindle S, it may be moved longitudinally thereon, and will carry with it the rod $a$, the range of motion of the two being limited, however, by the length of the slots $r$. The chuck C, as shown in Fig. 3, is split at the lines $o$ and $o$, and the center of it is bored out for a certain depth back of the face. An expanding-plug, $d$, with a tapering head, is screwed into the end of the rod $a$, and as the sleeve D is moved back from the chuck the tapering head of the plug $d$ will engage in the bore of the chuck, and therefore expand it to catch and hold the work.

The plug $d$ may be constructed of a piece with the rod $a$. The two are shown separate here so as to avoid having to unscrew the pin $i$ when it is desired to remove the chuck C.

In Figs. 4 and 5 is shown an outside chuck, F, in position on the spindle. The same plug $c$ is used for attaching the chuck, which latter is split, a portion of the outer surface of the chuck is turned straight, the other part tapering. Over the chuck is placed a collar or sleeve, G, bored for a portion of its length to fit the straight part of the chuck, and for the other portion to fit the smaller diameter of the tapering part of the chuck. This is made clear by referring to Fig. 4, where it may be seen that if the sleeve G is forced toward the face of the chuck, it must contract it and spring it down to hold the work.

Having explained the construction of the chucks and of the sleeves D and G for tightening them, we will now show the mode of operation.

In Figs. 6 and 7 is shown an outside chuck, F, in position. The sleeve D to operate the inside chuck, C, is left on the spindle, as it is necessary to unscrew only the chuck C and plug $d$ to make room for the chuck F. On either side and in front of the bearing B are two lugs, $m'\ m'$, (see also Fig. 9,) screwed into which, and in line with each other are two screws $p'\ p'$. A forked lever, $l$, is slipped over the sleeve G, which it straddles, and each fork of the lever is notched so as to find a support on the pins $p'\ p'$. The sleeve G has an annular groove, $j$, into which engage two pins, $n$ and $n$, on the lever $l$. Now, if the handle of the lever is pushed toward either end of the lathe, the pins $p'\ p'$ act as a fulcrum, and the sleeve G is made to slide back and forth over the chuck F, thus tightening or loosening it, as the case may be. The sleeve D is provided with a groove, $g$, similar to the groove $j$ on sleeve G; and on either side and back of the bearing B are two pins, $p$ and $p$, the counterpart of pins $p'$ and $p'$. Thus, if the chuck F be removed and the inside chuck C (as shown in Fig. 2) be substituted in its place, with its draw-plug $d$ connected so as to move with the sleeve D, then, by placing the lever $l$ in the position shown in dotted lines on Fig. 6, it may be used to operate the inside chuck, C, the pins $n\ n$ engaging in the groove $g$ and the pins $p$ and $p$ acting as fulcrums.

It is evident from the above description that by the use of the above attachments for operating the chucks they may be made to catch or release the work while running, as the rotation of the chucks and their operating sleeves in nowise interferes with the longitudinal motion of the lever and of the sleeves, and therefore the springing or releasing of the split chucks.

It is often required, when changing chucks, &c., to lock the spindle, and we show in Figs. 6, 8, and 9, respectively, in side view, front view, and part section and in plan, a device for that purpose. The collar $e$ is secured on the spindle S. The periphery of this collar has a number of radial holes to admit the latch $f$. A lug, $b$, is cast on the rear side of the bearing B, and is bored at right angles to the spindle S, and under the collar $e$. To the bore is fitted the little piston $w$, of a piece with the latch $f$. The cover (shown secured by a set-screw) acts as a stop to the piston $w$, which is always pushed upward by the coil of spring under it. The lower end of the latch $f$ projects through the bottom of the lug $b$, and to it is attached the lever $q$. In Fig. 8 the latch $f$ is shown disengaged from the wheel $e$, the spring under the piston $w$ being compressed. The latch $f$ is thus disengaged when the lever $q$ is at right angles to the shears of the lathe, in the position shown in Fig. 6 and in full lines in Figs. 8 and 9, and in such position the lever $q$ and therefore the latch $f$ are held down by the cam-shaped projection $h$ cast on the frame. When it is desired to lock the spindle, the lever $q$ is made to swing to the position shown in dotted lines in the plan, Fig. 9, and thereby works clear of the projection $h$ and releases the spring, which, in its turn, forces the latch $f$ into one of the holes on the collar $e$, thus locking the spindle. To release it, the lever $q$ is again turned at right angles to the shears, and in so doing it meets the projection $h$, which forces it downward, together with the latch $f$.

Our object in constructing the above locking device is to accomplish the purpose with a very small motion of the latch, to avoid long leverages, and to provide a support for the latch close to the spindle, as afforded here by the lug $b$ acting as a guide to the latch.

What we claim as our invention, and desire to secure by Letters Patent, is—

1. The combination, with the spindle and its bearings, of the alternative inside and outside chucks, both fitted to the spindle, the sleeve D and the rod $a$, sliding within the spindle and serving to connect said sleeve with the expanding-plug of the inside chuck, the alternative sleeve G of the outside chuck, the reversible lever $l$, capable of engagement with either sleeve, and the alternative fulcrums for said lever, substantially as and for the purpose herein described.

2. The combination, with the slotted spindle and its bearings, of the inside chuck fitted to the spindle, the rod $a$, sliding in the spindle and serving to operate the central expanding-plug of the chuck, the sleeve D, capable of rotating with and sliding upon the spindle, a transverse pin connecting said sleeve and rod, a fulcrum upon the lathe-head, and a lever, $l$, capable of engagement with the said fulcrum and sleeve, and serving to operate the latter while the spindle rotates, substantially as herein described.

3. In a speed-lathe, the locking device consisting of indented collar $e$, spring-latch $f$, guide $b$, lever $q$, and cam-shaped projection $h$ on the frame of the lathe, or their equivalents, all substantially as and for the purpose specified.

JOHN CAVAGNARO.
FRANCIS CAVAGNARO.

Witnesses:
F. J. HERRON,
E. M. HUGENTOBLER.